United States Patent [19]

Schreckenberg et al.

[11] 4,281,101
[45] Jul. 28, 1981

[54] PROCESS FOR THE PREPARATION OF ALIPHATIC-AROMATIC POLYCARBONATES WITH DIPHENOL CARBONATE END GROUPS AND THEIR USE FOR THE PREPARATION OF HIGH-MOLECULAR, SEGMENTED, ALIPHATIC-AROMATIC POLYCARBONATE ELASTOMERS WHICH CAN BE PROCESSED AS THERMOPLASTICS

[75] Inventors: Manfred Schreckenberg, Krefeld; Klaus König, Leverkusen; Dieter Freitag, Krefeld; Günther Lehnert, Leverkusen; Christian Lindner, Cologne, all of Fed. Rep. of Germany

[73] Assignee: Bayer Aktiengesellschaft, Leverkusen, Fed. Rep. of Germany

[21] Appl. No.: 44,786

[22] Filed: May 31, 1979

[30] Foreign Application Priority Data

Jun. 22, 1978 [DE] Fed. Rep. of Germany ....... 2827325

[51] Int. Cl.³ .............................................. C08G 63/62

[52] U.S. Cl. .................................... 528/196; 260/463; 528/171; 528/174; 528/199; 528/202; 525/462

[58] Field of Search ............... 528/204, 196, 197, 171, 528/174, 202, 199; 260/463

[56] References Cited

U.S. PATENT DOCUMENTS

| | | | |
|---|---|---|---|
| 2,991,273 | 7/1961 | Hechelhammer | 528/204 |
| 3,069,385 | 12/1962 | Stevens | 528/200 |
| 3,161,615 | 12/1964 | Goldberg | 528/204 |
| 4,142,035 | 2/1979 | Idel et al. | 528/200 |

FOREIGN PATENT DOCUMENTS 808485 2/1959 United Kingdom .

*Primary Examiner*—Theodore E. Pertilla
*Attorney, Agent, or Firm*—Gene Harsh; Lawrence S. Pope; Aron Preis

[57] ABSTRACT

The subject of instant invention is a process for the preparation of aliphatic-aromatic polycarbonates with diphenol carbonate end groups, the polycarbonates obtained therefrom and their use for the preparation of high-molecular, segmented, aliphatic-aromatic polycarbonate elastomers which can be processed as thermoplastics.

25 Claims, No Drawings

PROCESS FOR THE PREPARATION OF ALIPHATIC-AROMATIC POLYCARBONATES WITH DIPHENOL CARBONATE END GROUPS AND THEIR USE FOR THE PREPARATION OF HIGH-MOLECULAR, SEGMENTED, ALIPHATIC-AROMATIC POLYCARBONATE ELASTOMERS WHICH CAN BE PROCESSED AS THERMOPLASTICS

The present invention relates to a process for the preparation of aliphatic-aromatic polycarbonates with diphenol carbonate end groups, which is characterised in that aliphatic diols and aromatic bisphenols are reacted with diphenyl carbonate in one reaction step to give aliphatic-aromatic copolycarbonates, phenol being split off.

The invention furthermore relates to the aliphatic-aromatic polycarbonates, with diphenol carbonate end groups, obtained according to the invention and their use for the preparation of high-molecular, segmented, aliphatic-aromatic polycarbonate elastomers which can be processed as thermoplastics. The present invention additionally relates to the high-molecular aliphatic-aromatic polycarbonate elastomers obtained according to the invention.

Aliphatic polycarbonates are known, and they can be prepared, according to DOS (German Published Specification) No. 1,595,446, by reacting aliphatic diols with phosgene. A further process for the preparation of aliphatic polycarbonates with hydroxyl groups consists in reacting a diol with diphenyl carbonate in accordance with the trans-esterification process (DAS (German Published Specification) No. 1,915,908).

The present invention relates to a process for the preparation of aliphatic-aromatic polycarbonates with diphenol carbonate end groups, which is characterised in that aliphatic diols, the OH groups of which are in at least the α-position and γ-position relative to one another or further removed from one another, carbonic acid bis-aryl esters (for example diphenyl carbonate) and diphenols (for example bisphenol A) are conjointly reacted, if appropriate also using catalysts, at temperatures between 80° and 270° C. and in vacuo between 200 mm Hg and 0.1 mm Hg, n mols of aliphatic diol, m mols of diphenol and p mols of carbonic acid bis-aryl ester being employed for the preparation of 1 mol of the aliphatic-aromatic polycarbonate, n being a number from 1 to 100 preferably from 2 to 40 and being chosen in each case so that the product of n and of the molecular weight $\overline{M}_n$ (number average), increased by 26, of the diol employed is a number between 300 and 10,000 preferably 500 and 6000 and m, being any desired number between 2 and 5 and p being at least n+1, but at most (n+m)−1.

The resulting bis-diphenol carbonates have, for example, the following ideal formula (I)

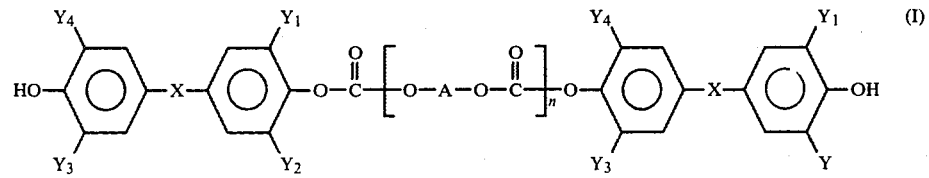

wherein

A is the bivalent radical of an aliphatic diol, the end groups result from the diphenols of the formula (II)

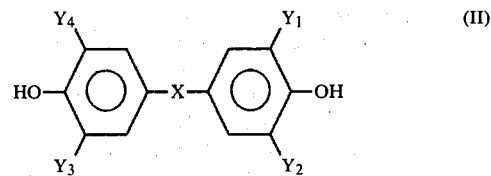

wherein

X denote a single bond, —CH$_2$—,

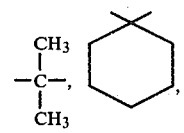

O, S, SO$_2$ or

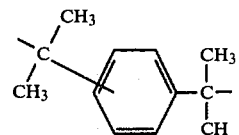

and

Y$_1$ to Y$_4$ are identical or different and denote hydrogen, C$_1$–C$_4$-alkyl, such as, for example, methyl, or halogen, such as, for example, chlorine or bromine, and n denotes a number from 1 to 100.

Suitable catalysts for the preparation, according to the invention, of the aliphatic-aromatic polycarbonates with diphenol carbonate end groups are: (a) transition metal compounds, such as titanic acid tetraalkyl esters, dialkyl-tin dicarboxylates, tin dicarboxylates, chelates of Fe, Zn, Co, Ni or Pb and carboxylates of Pb, Co, Ni or Fe, and (b) bases, such as tertiary amines, or oxides, hydroxides, carbonates, alcoholates, phenolates or carboxylates of alkali metals or alkaline earth metals.

The catalyst is used in amounts between 0.0001 and 1% by weight, preferably between 0.001 and 0.1% by weight, relative to the total weight of the reaction mixture employed.

The process according to the invention is characterised in that the polycondensation of aliphatic diols and aromatic diphenols with carbonic acid bis-aryl esters is carried out at 80°–270° C., preferably at 100°–220° C., and in vacuo between 200 mm Hg and 0.1 mm Hg, until about 99.9% of the phenol liberated during the reaction have distilled off.

Residual amounts of phenol can then be blown out with an inert gas.

The process according to the invention for the preparation of the aliphatic-aromatic polycarbonates with diphenol carbonate end groups is preferably carried out in the absence of solvents for the reactants, in particular in bulk.

The reaction time for the trans-esterification process for the preparation of the aliphatic-aromatic polycarbonates with diphenol carbonate end groups is between 2 and 60 hours, depending on the reaction temperature and on the nature and the amount of the catalyst.

Surprisingly, random polycarbonate mixtures with aliphatic and aromatic OH groups are not formed during the conjoint condensation reaction, but selective condensation of the aliphatic component first takes place. The diphenol acts only at the end of the reaction and is linked with the chain ends of the polycarbonate, so that the products according to the invention contain the OH excess, prescribed in the recipes, of 2 mols almost exclusively in the form of phenolic OH end groups.

Suitable carbonic acid bis-aryl esters are, in particular, those of the formula (III)

wherein
Ar is a substituted or unsubstituted aryl radical with 6 to 18 C atoms.

Possible substituents are, in particular, $C_1$–$C_4$-alkyl radicals, and nitro and halogen, such as, for example, chlorine or bromine. Examples of these compounds are diphenyl carbonate, alkyl-substituted diphenyl carbonates, such as the di-toluyl carbonates halogen-substituted diphenyl carbonates, such as the di-chlorophenyl carbonates, dinaphthyl carbonate and alkyl-substituted and halogen-substituted dinaphthyl carbonates; in these compounds, the nitro, alkyl or halogen substituents on the two phenyl nuclei or on the two naphthyl nuclei of the diaryl carbonates can be identical or different or symmetrical or unsymmetrical relative to one another. Thus, for example, phenyl toluyl carbonate, phenyl chlorophenyl carbonate, 2-toluyl 4-toluyl carbonate or 4-toluyl 4-chlorophenyl carbonate are also suitable for the process.

Diols which are suitable for the preparation, according to the invention, of the aliphatic-aromatic polycarbonates with diphenol carbonate end groups, shall have a $\overline{M}n$ (number average molecular weight) between 76 and 400, preferably between 76 and 300, and are for example the following: 1,3-propanediol, 1,4-butanediol, 1,5-pentanediol, 3-methyl-1,5-pentanediol, trimethyl-1,6-hexanediol, 1,6-hexanediol, 1,12-dodecanediol, 1,12-octadecanediol, diethylene glycol, triethylene glycol and higher homologues thereof, dipropylene glycol, tripropylene glycol and neopentyl glycol.

Further diols which are suitable according to the invention are the prepolymeric aliphatic polycarbonate-diols mentioned below, as long as they fulfil the conditions laid down above with regard to their OH groups, which are prepared from glycols, such as diethylene glycol, triethylene glycol and tetraethylene glycol, 1,6-hexanediol, 1,4-butanediol or 1,12-dodecanediol, by trans-esterification with diethyl carbonate or diphenyl carbonate or by reaction with phosgene, in accordance with known processes and which shall have a $\overline{M}n$ between 300 and 3000.

Diphenols which are suitable for the preparation, according to the invention, of the aliphatic-aromatic polycarbonates with diphenol carbonate end groups are: hydroquinone, resorcinol, dihydroxydiphenyls, bis-(hydroxyphenyl)-alkanes, bis-(hydroxyphenyl)-cycloalkanes, bis-(hydroxyphenyl) sulphides, bis-(hydroxyphenyl) ethers, bis-(hydroxyphenyl) ketones, bis-(hydroxyphenyl) sulphoxides, bis-(hydroxyphenyl) sulphones and α,α-bis-(hydroxyphenyl)diisopropylbenzenes, and nuclear-alkylated and nuclear-halogenated compounds thereof. These and other suitable aromatic dihydroxy compounds are listed, for example, in U.S. Pat. Nos. 3,028,365, 2,999,835, 3,148,172, 3,271,368, 2,991,273, 3,217,367, 3,280,078, 3,014,891 and 2,999,846 and in German Offenlegungsschriften (German Published Specifications) Nos. 2,063,050 and 2,211,957.

Examples of suitable diphenols are bis-(4-hydroxyphenyl)-methane, 4,4'-dihydroxydiphenyl, 2,4-bis-(4-hydroxyphenyl)-2-methylbutane, α,α-bis-(4-hydroxyphenyl)-p-diisopropylbenzene, 2,2-bis-(3-chloro-4-hydroxyphenyl)propane and 2,2-bis-(3,5-dimethyl-4-hydroxyphenyl)-propane.

Examples of preferred diphenols are 2,2-bis-(4-hydroxyphenyl)-propane, 1,1-bis-(4-hydroxyphenyl)-cyclohexane, 2,2-bis-(3,5-dichloro-4-hydroxyphenyl)-propane, 2,2-bis-(3,5-dibromo-4-hydroxyphenyl)-propane, 2,2-bis-(3,5-dimethyl-4-hydroxyphenyl)-propane, bis-(3,5-dimethyl-4-hydroxyphenyl)-methane and bis-(4-hydroxyphenyl) sulphide.

It is possible to employ either one or several of the diphenols which are suitable according to the invention.

Examples of aliphatic-aromatic polycarbonates, with diphenol carbonate end groups, according to the invention are thus those of the ideal formulae Ia–Ii

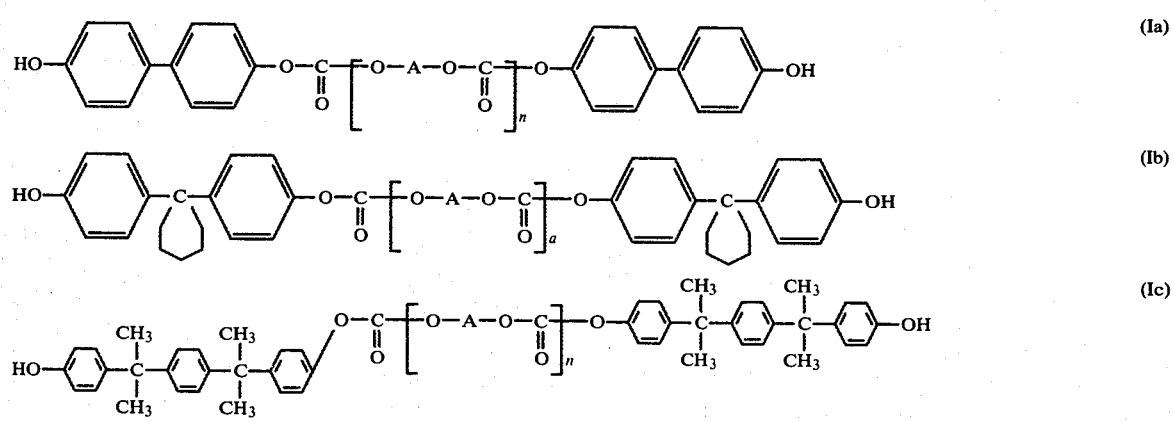

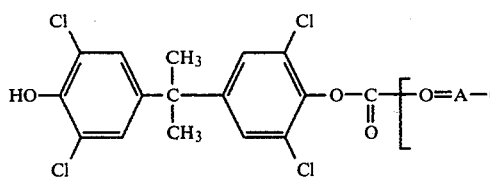
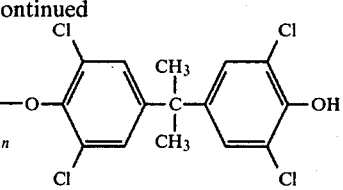
(Id)

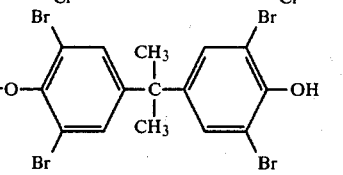
(Ie)

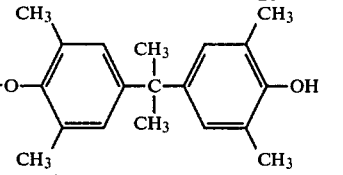
(If)

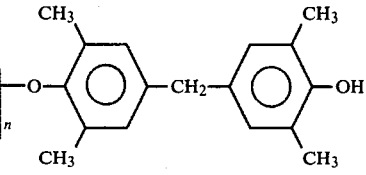
(Ig)

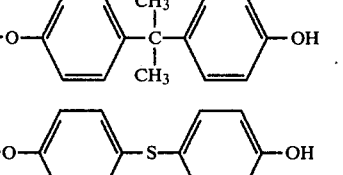
(Ih)

(Ii)

wherein

A is a bivalent radical of the diols having $\overline{M}n$ between 76 and 400, preferably between 76 and 300 which are suitable according to the invention and n denotes a number from 1 to 100, preferably between 2 to 40.

The aliphatic-aromatic polycarbonates, with diphenol carbonate end groups, according to the invention can be employed as starting bisphenols for the preparation of polycarbonates by the known two-phase boundary polycondensation process. High-molecular aliphatic-aromatic polycarbonate elastomers which are built up in a particular manner are thus obtained.

The present invention thus relates to the preparation of high-molecular aliphatic-aromatic polycarbonate elastomers, which is characterised in that the aliphatic-aromatic polycarbonates, with diphenol carbonate end groups, according to the invention, in particular those of the formula (I), are reacted with other diphenols, in particular those of the formula (II), and with phosgene in a liquid mixture of inert organic solvent and alkaline aqueous solution at temperatures between 0° C. and 80° C., preferably between 15° C. and 40° C., at a pH value between 9 and 14, and, after the phosgenation, the products are subjected to polycondensation reactions by adding 0.2 mol % to 10 mol % of tertiary aliphatic amines, relative to the molar amount of diphenol, the weight ratio of aliphatic-aromatic polycarbonates with diphenol carbonate end groups to the other diphenol being determined by the desired proportion of aromatic polycarbonate and the proportion of aliphatic polycarbonate in the high-molecular, aliphatic-aromatic polycarbonate elastomers. The weight ratio of aliphatic-aromatic polycarbonate with phenolic end groups to the other diphenol is preferably between 2:1 and 1:2. In this procedure, times of between 5 minutes and 90 minutes are required for the phosgenation and times of between 3 minutes and 3 hours are required for the polycondensation.

The present invention thus also relates to high-molecular aliphatic-aromatic polycarbonate elastomers obtained by this process according to the invention.

From a morphological point of view, the high-molecular aliphatic-aromatic polycarbonate elastomers obtained according to the invention preferably have two different, spatially separated phases, that is to say regions, which are composed of an amorphous aliphatic polycarbonate phase (soft segment phase) and an amorphous or amorphous-crystalline aromatic polycarbonate phase (hard segment phase).

Detailed explanations of the division of the soft segment phase from the hard segment phase are given in DOS (German Published Specification) No. 2,636,783 (Le A 16 689) and DOS (German Published Specification) No. 2,636,784 (Le A 17 025).

In the case of multi-phase systems, the high-molecular aliphatic-aromatic polycarbonate elastomers according to the invention have a higher heat distortion point than comparable single-phase polycarbonate elastomers.

Single-phase polycarbonate elastomers are described, for example, in U.S. Pat. No. 3,151,615. They are obtainable by various processes, but preferably by the "pyridine process" known from the preparation of polycarbonates.

The preparation of two-phase polymers, for example of polycarbonate-polycaprolactones, could hitherto be effected only by means of bischloroformic acid esters of polycaprolactones and polycarbonate oligomers (see French Pat. No. 2,235,965).

Corresponding statements also apply to the polycarbonate elastomers of DT-AS (German Published Specification) No. 1,162,559, although these elastomers have not been proved to be two-phase.

Compared with the use of corresponding bischloroformic acid esters, the use, according to the invention, of the aliphatic-aromatic polycarbonates, with diphenol carbonate end groups, according to the invention has the advantage that the polymers are not sensitive to hydrolysis and thus have a better storage stability and an unambiguously bifunctional reactivity.

In addition to their particular resistance to heat exposure, the high-molecular, segmented aliphatic-aromatic polycarbonate elastomers which can be processed as thermoplastics and are prepared by the process according to the invention exhibit good transparency, highly elastic properties and an outstanding elongation at break of >200%.

The other diphenols suitable for the preparation, according to the invention, of the aliphatic-aromatic polycarbonate elastomers from the aliphatic-aromatic polycarbonates, with diphenol carbonate end groups, according to the invention are those which have already been mentioned, on page 5 of this Patent Application, for the preparation of the aliphatic-aromatic polycarbonates with diphenol carbonate end groups, in particular those of the formula (II) on page 2 of this Patent Application; examples of suitable diphenols are 4,4'-dihydroxy-diphenyl, bis-(4-hydroxyphenyl)-methane, 2,4-bis-(4-hydroxyphenyl)-2-methylbutane, α,α-bis-(4-hydroxyphenyl)-p-diisopropylbenzene, 2,2-bis-(3-chloro-4-hydroxyphenyl)-propane, bis-(4-hydroxyphenyl) sulphide, 2,2-bis-(3,5-dimethyl-4-hydroxyphenyl)-propane and bis-(3,5-dimethyl-4-hydroxyphenyl)-methane.

2,2-Bis-(4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane, bis-(4-hydroxyphenyl) sulphide, bis-(3,5-dimethyl-4-hydroxyphenyl)-methane and 2,2-bis-(3,5-dimethyl-4-hydroxyphenyl)-propane are preferably used as the other diphenols for the preparation, according to the invention, of the high-molecular aliphatic-aromatic polycarbonate elastomers. Any desired mixtures of these other diphenols can also be employed.

Branched products which have better flow properties during processing are obtained by incorporating small amounts, preferably between 0.05 and 2 mol % (relative to the diphenols employed), of compounds which are trifunctional or more than trifunctional, in particular those with three or more than three phenolic hydroxyl groups.

Examples of suitable compounds which are trifunctional or more than trifunctional are: phloroglucinol, 4,6-dimethyl-2,4,6-tri-(3-hydroxyphenyl)-hept-2-ene, 4,6-dimethyl-2,4,6-tri(4-hydroxyphenyl)-heptane, 1,3,5-tri-(4-hydroxyphenyl)-benzene, 1,1,1-tri-(3-hydroxyphenyl)-ethane, tri-(4-hydroxyphenyl)-phenylmethane, 2,2-bis-[4,4-(4,4'-dihydroxydiphenyl)cyclohexyl]-propane, 2,4-bis-(4-hydroxyphenyl-isopropyl)-phenol, 2,6-bis-(2'-hydroxy-5'-methylbenzyl)-4-methyl-phenol, 2,4-dihydroxybenzoic acid, 2-(4-hydroxyphenyl)-2-(2,4-dihydroxyphenyl)-propane, 1,4-bis-(4',4''-dihydroxytriphenyl-methyl)-benzene, 3,3-bis-(4-hydroxyphenyl)-2-oxo-2,3-dihydroindole and 3,3-bis-(3-methyl-4-hydroxyphenyl)-2-oxo-2,3-dihydroindole.

It is also possible to branch the high-molecular aliphatic-aromatic polycarbonate elastomers according to the invention via the soft segment component, and in particular by also using polyols with more than 2 aliphatic OH groups, in particular triols or tetraols, in the preparation of the aliphatic-aromatic polycarbonates with diphenol carbonate end groups.

The chain length of the high-molecular aliphatic-aromatic polycarbonate elastomers can be adjusted by adding a chain stopper, for example a monofunctional phenol, such as phenol, 2,6-dimethylphenol, p-bromophenol or p-tert.-butylphenol, between 0.1 and 10 mol % of chain stopper being added per mol of diphenol employed.

The high-molecular, segmented aliphatic-aromatic polycarbonate elastomers which can be processed as thermoplastics are prepared, according to the invention, by the two-phase boundary polycondensation process, preferably by a procedure in which one of the abovementioned other diphenols or mixtures thereof, in particular those of the formula (II), are dissolved in an alkaline aqueous solution, whilst the aliphatic-aromatic polycarbonates, with diphenol carbonate end groups, according to the invention, in particular those of the formula (I), or mixtures thereof are dissolved in a water-immiscible inert organic solvent, and the two solutions are mixed before the phosgenation.

The solutions, obtained when the reaction has ended, of the high-molecular aliphatic-aromatic polycarbonate elastomers in the organic solvents are worked up analogously to the solutions of the thermoplastic polycarbonates prepared by the two-phase boundary process, it being possible to additionally after-treat the high-molecular aliphatic-aromatic polycarbonates, and in particular they are either (a) isolated by known processes, for example by precipitation with methanol or ethanol, and then dried and heat-treated, or subjected to shearing forces or dissolved in organic solvents and allowed to gel, or (b) already subjected to shearing forces, for example in a devolatilisation extruder, during isolation, or (c) allowed to gel, before isolation, in the solvent used for the preparation of the high-molecular aliphatic-aromatic polycarbonates by the two-phase boundary process.

Suitable inert organic solvents for the preparation process for the high-molecular aliphatic-aromatic polycarbonate elastomers are water-immiscible aliphatic chlorinated hydrocarbons, such as methylene chloride, chloroform and 1,2-dichloroethane, or chlorinated aromatic compounds, such as chlorobenzene, dichlorobenzene and chlorotoluene, or mixtures of these solvents.

Suitable alkaline aqueous solutions for the process according to the invention are solutions of LiOH, NaOH, KOH, $Ca(OH)_2$ or $Ba(OH_2)$ in water.

Suitable tertiary aliphatic amines for the process according to the invention are those with 3 to 15 C atoms, that is to say, for example, trimethylamine, triethylamine, n-tripropylamine and n-tributylamine; the amount varies, depending on the diphenol employed, between 0.2 and 5 mol %, and between 5 and 10 mol % when tetramethyl-substituted diphenols are employed, in each case relative to the total amount of diphenols employed (=the particular sum of aliphatic-aromatic polycarbonate with diphenol carbonate end groups and other diphenols).

The high-molecular aliphatic-aromatic polycarbonate elastomers can be isolated according to DOS (German Published Specification) No. 2,636,783 (Le A 16 689) and DOS (German Published Specification) No. 2,636,784 (Le A 17 025).

The reaction, according to the invention, of the aliphatic-aromatic polycarbonates according to the invention with other diphenols and with phosgene by the two-phase boundary process takes place quantitatively; the particular reactant ratio of aliphatic-aromatic polycarbonate to the other diphenol is thus determined by the proportion of aromatic polycarbonate that the particular high-molecular aliphatic-aromatic polycarbonate to be synthesised should have.

Depending on the desired spectrum of properties, the proportion of aromatic polycarbonate in the high-molecular aliphatic-aromatic polycarbonate elastomers prepared by the process according to the invention is between about 30 and 95, preferably about 35 and 80, % by weight, the hardness and heat distortion point increasing and the elasticity and elongation at break decreasing as the proportion of aromatic polycarbonate increases.

The proportion of aromatic polycarbonate in the high-molecular aliphatic-aromatic polycarbonates according to the invention is to be understood as the amount by weight of aromatic carbonate structural units of the following formula (IV)

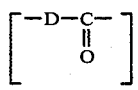

(IV)

wherein
D represents the diphenolate radicals in the high-molecular aliphatic-aromatic polycarbonate, in particular of aromatic carbonate structural units of the formula (IIa)

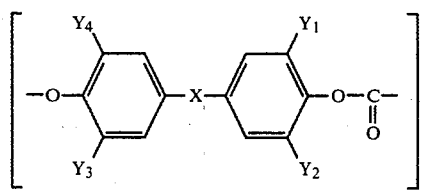

(IIa)

wherein
X and $Y_1$ to $Y_4$ have the meaning given in the case of the formula (II).

Accordingly, the proportion of soft segment in the high-molecular aliphatic-aromatic polycarbonate elastomers according to the invention is to be understood as the amount by weight of aliphatic polycarbonate structural units (V) in one of the diols described on page 5, of the simplified formula

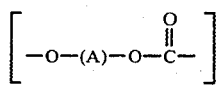

(V)

The present invention thus also relates to high-molecular aliphatic-aromatic polycarbonate elastomers, which are characterised in that they consist of about 30 to 95% by weight, preferably of about 35 to 80% by weight, of aromatic carbonate structural units of the formula (IV), in particular those of the formula (IIa), and of about 70 to 5% by weight, preferably of about 65 to 20% by weight, of aliphatic carbonate structural units of the formula (V).

Examples of preferred high-molecular aliphatic-aromatic polycarbonates according to the invention are those which consist 30 to 95% by weight, preferably of 35 to 80% by weight, of carbonate structural units of the formula (IIb), (IIc) and (IId)

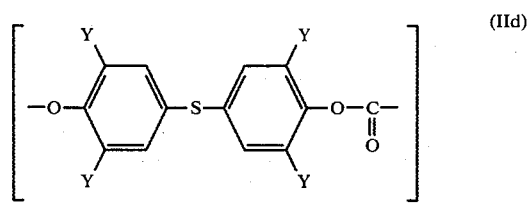

(IId)

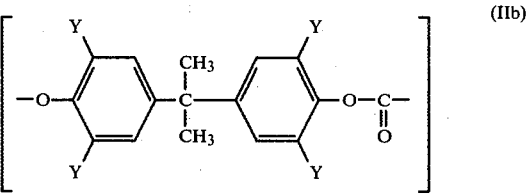

(IIb)

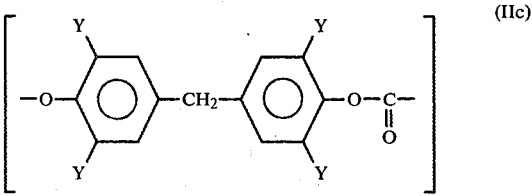

(IIc)

wherein
Y is H, Cl, Br or $CH_3$,
and of 70 to 5% by weight, preferably 65 to 20% by weight, of aliphatic carbonate structural units of the formula (V).

The high-molecular aliphatic-aromatic polycarbonate elastomers according to the invention should have average molecular weights $\overline{M}w$ (weight average) of 25,000 to 200,000, preferably of 40,000 to 150,000, determined by the lightscattering method with a dispersion photometer. The relative solution viscosities $\eta rel$ (measured on solutions of 0.5 g in 100 ml of $CH_2Cl_2$ at 25° C.) of the high-molecular aliphatic-aromatic polycarbonates according to the invention are between 1.3 and 3.0, preferably between 1.4 and 2.6.

Depending on the working-up conditions, the high-molecular, segmented, high-molecular aliphatic-aromatic polycarbonate elastomers which can be processed as thermoplastics and are prepared by the process according to the invention are in the form of single-phase systems or multi-phase systems. Further explanations of this are given in DOS (German Published Specification) No. 2,636,783 (Le A 16 689) and DOS (German Published Specification) No. 2,636,784 (Le A 17 025).

The stability of the high-molecular aliphatic-aromatic polycarbonates according to the invention to UV light and their stability to hydrolysis can be improved by UV stabilisers, such as, for example, substituted "benzophenones" or "benztriazoles", in amounts customary for aliphatic and aromatic polycarbonates, and by agents which provide protection against hydrolysis, such as, for example, monocarbodiimides and, above all, polycarbodiimides (compare W. Neumann, J. Peter, J. Holtschmidt and W. Kallert, Preceeding of the 4th Rubber Technology Conference, London, 22nd-25th May 1962, pages 738-751), in amounts of 0.2-5% by weight, relative to the weight of the high-molecular aliphatic-aromatic polycarbonates.

In order to modify the products according to the invention, it is possible to add substances such as, for example, carbon black, kieselguhr, kaolin, clays, $CaF_2$, $CaCO_3$, aluminium oxides and customary glass fibres, in amounts of 2 to 40% by weight, in each case relative to the total weight of the moulding composition, and inorganic pigments, both as fillers and as nucleating agents.

If flame-resistant products are desired, about 5 to 15% by weight, in each case relative to the weight of the high-molecular aliphatic-aromatic polycarbonate elastomers, of flameproofing agents known in the chemistry of thermoplastic polyesters and thermoplastic polycarbonates, such as, for example, antimony trioxide, tetrabromophthalic anhydride, hexabromocyclododecane, tetrachloro- or tetrabromo-bisphenol A or tris-(2,3-dichloropropyl) phosphate, can be mixed in, tetrachloro- and tetrabromo-bisphenols randomly incorporated in the polycarbonate constituents of the polycarbonates according to the invention likewise exhibiting flame-resistant properties.

Furthermore, processing auxiliaries known in the chemistry of thermoplastic polyesters and thermoplastic polycarbonates, such as mould release agents, can be used in an effective manner.

The high-molecular aliphatic-aromatic polycarbonate elastomers obtained by the process according to the invention can be advantageously used in all cases where a combination of hardness and elasticity, in particular of cold flexibility, is desired, for example in bodywork construction, for the production of low-pressure tyres for vehicles, for sheathings for hoses, plates and pipes and for flexible drive pulleys.

The average molecular weights given in the examples which follow are number-averages $\overline{M}n$ and are obtained by determining the OH number.

The OH number of the aliphatic-aromatic polycarbonates with diphenol carbonate end groups is determined by acylation of the polycarbonates with acetic anhydride in pyridine and back-titration of the acetic acid formed and the excess of anhydride with NaOH.

Both aliphatic and phenolic hydroxyl groups are determined by this procedure. If phthalic anhydride is used instead of acetic anhydride, only aliphatic hydroxyl groups are acylated under the analysis conditions. The difference in the analyses gives the content of phenolic OH groups.

The relative solution viscosity $\eta rel$ of Examples $B_1-B_8$ is defined as the viscosity of 0.5 g of the high-molecular aliphatic-aromatic polycarbonate elastomer in 100 ml of methylene chloride or phenol/o-dichlorobenzene = 1:1 at 25° C.

The tensile strength and the elongation at breakwere measured in accordance with the method of DIN 53,455.

Investigations by gel chromatography were carried out at room temperature in tetrahydrofurane using Styragel columns (separation range $1.5 \times 10^5$ Å, $1 \times 10^5$ Å, $3-10^4$ Å and $2 \times 10^3$ Å).

Calibration with bisphenol A polycarbonate was used for the determination. No large deviations compared with the $\overline{M}w$ determination by the light-scattering method were found.

EXAMPLE A1

Preparation of a hexanediol polycarbonate ($\overline{M}n$ 2,750) with diphenol carbonate end groups of 2,2-bis-(4-hydroxyphenyl)propane (bisphenol A)

1.5 molar batch

A 10 l three-necked flask, equipped with a stirrer, a contact thermometer, a packed column (diameter: 8 cm, height: 80 cm), a distillation bridge heated to 45° C. and a 6 l receiver, is charged with 2,478 g (21 mols) of 1,6-hexanediol, 1,026 g (4.5 mols) of 2,2-bis-(4-hydroxyphenyl)propane and 5,136 g (24 mols) of diphenyl carbonate. When the mixture has been melted at 100°, 2 ml of a 40% strength sodium hydroxide solution (1 g of NaOH) are stirred in. A vacuum of 15 mm Hg is now applied and the temperature is raised to 150° C. in the course of 8 hours. 4,320 g (95.7% of theory) of pure phenol are thereby distilled off. A further 167 g (3.7% of theory) of phenol can be distilled off under 0.3 mm Hg in the course of 30 minutes. The mixture is cooled to 120° C. and neutralised with 5 ml of 20% strength hydrochloric acid. It is then heated to 190° C. under 0.3 mm Hg for a further 1 hour, whereupon the total amount of phenol which is distilled off increases to 4,509 g (99.9% of theory). A yellowish viscous resin remains, which solidifies as a wax-like solid below 40°. Determination of the OH number gives 40.6 (calculated: 40.7) by the acetic anhydride method and 0.8 by the phthalic anhydride method. Determination of the phenolic OH groups by the $TiCl_4$ method gives 1.25% by weight (calculated: 1.23%).

EXAMPLE A2

Preparation of a hexanediol polycarbonate ($\overline{M}n$ 4,100) with diphenol carbonate end groups of 2,2-bis-(4-hydroxyphenyl)propane (bisphenol A)

1 molar batch 2,950 g (25 mols) of 1,6-hexanediol and 456 g (2 mols) of 2,2-bis-(4-hydroxyphenyl)-propane are subjected to a conjoint condensation reaction with 5,564 g (26 mols) of diphenyl carbonate as in Example A1, using 50 mg of NaOH. During this reaction, the temperature is first raised from 110° C. to 150° C. under 15 mm Hg. After a further hour at 150° and under 0.7 mm Hg, the catalyst is neutralised with 20% strength HCL (excess) and small residual amounts of phenol are then distilled off at 200° C. under 0.5 mm Hg.

A viscous wax with a softening point of ≈45° and a OH number (acetic anhydride method) of 27.5 (calculated: 27.4) is obtained.

EXAMPLE A3

Preparations of a triethylene glycol polycarbonate ($\overline{M}n$ 2,900) with diphenol carbonate end groups of 2,2-bis-(4-hydroxyphenyl)-propane 1.5 molar batch 2,700 g (18 mols) of triethylene glycol and 1,026 g (4.5 mols) of 2,2-bis-(4-hydroxyphenyl)-propane are subjected to a conjoint condensation reaction with 4,494 g (21 mols) of diphenyl carbonate in the same apparatus, without a catalyst. During this reaction, the temperature is raised from an initial 100° C. to 200° C.

under 15 mm Hg in the course of 8 hours. The condensation reaction is then continued under 0.5 mm Hg, first at 200° C. for 1 hour and then at 220° C. for a further one hour. Thereafter, the formation of phenol has ended. A total of 3,950 g (calculated: 3,948 g) of phenol is collected in the receiver.

A light yellow viscous product with a OH number of 36.9 (calculated: 39.3), determined by the acetic anhydride method, is obtained.

The phthalic anhydride method gives a OH number of 0.3.

Various diphenols and catalysts have been employed in the examples in Table I which follows.

The condensation reaction is carried out at 125° C./12 mm Hg initially, up to 200° C./0.5 mm Hg and the total condensation time is 12 hours.

TABLE I

| Example | Mols of hexanediol | Mols of diphenol | Mols of diphenyl carbonate | ppm of catalyst | OH number |
|---|---|---|---|---|---|
| A4 | 14 | 2 of 2,2-bis-(3,5-dimethyl-4-hydroxyphenyl)-propane | 15 | 50 of dibutyl-tin dilaurate | 42.5 |
| A5 | 14 | 2 of bis-(3,5-dimethyl-4-hydroxyphenyl)-methane | 15 | 50 of dibutyl-tin dilaurate | 43.5 |
| A6 | 14 | 3 of 4,4'-dihydroxydiphenyl sulphide | 16 | 10 of $MgCO_3$ | 40.8 |
| A7 | 14 | 3 of 1,1-bis-(4-hydroxyphenyl)-cyclohexane | 15 | 10 of potassium phenolate | 78.2 |
| A8 | 14 | 3 of 4,4'-dihydroxydiphenyl | 16 | 20 of titanic acid tetrabutyl ester | 42.9 |

EXAMPLE B1

Preparation of a high-molecular, segmented aliphatic-aromatic polycarbonate of 55% by weight of 1,6-hexanediol polycarbonate and 45% by weight of bisphenol A polycarbonate 3,414 g of the precursor from Example A1, dissolved in 35 liters of $CH_2Cl_2$, are added to a solution of 879 g (3.85 mols) of bisphenol A, 1,415 g of 45 percent strength NaOH and 30 liters of distilled water.

A solution of 16.09 g of 1,4-bis-(4,4''-dihydroxytriphenylmethyl)-benzene and 145 g of 5 percent strength NaOH is added to this mixture. 1,181 g (11.95 mols) of phosgene are passed into the mixture at 20°–25° C. in the course of 35 minutes, whilst stirring and under a nitrogen atmosphere. During the introduction, 2,070 g of 45 percent strength NaOH are simultaneously added dropwise in a manner such that the pH value remains constant at pH 13. After passing in the phosgene, 8.05 g of triethylamine are added and the mixture is stirred for 1 hour. The organic phase is separated off and washed successively with 2 percent strength phosphoric acid and finally with distilled water until free from electrolytes. After separating off the water, the organic solution is concentrated. Isolation of the high-molecular aliphatic-aromatic polycarbonate is effected by extrusion in an evaporation extruder at about 200°–220° C. under the conditions known for polycarbonate extrusion.

The relative viscosity of the resulting aliphatic-aromatic polycarbonate $\eta_{rel}$ is 1.82 (measured in $CH_2Cl_2$ at 25° C. and (5 g/l).

According to the determination by gel chromatography, the polycarbonate elastomer has a bimodal distribution function with a high-molecular secondary maximum at a molecular weight of about 300,000 and a principal maximum at a molecular weight of about 52,000. Some mechanical properties of a film are:
tensile strength: 23.4 MPa;
elongation at break: 260%.

EXAMPLE B2

Preparation of a high-molecular, segmented, aliphatic-aromatic polycarbonate of 55% by weight of 1,6-hexanediol polycarbonate and 45% by weight of bisphenol A polycarbonate 2,789 g of the precursor from Example A2, dissolved in 35 liters of $CH_2Cl_2$, are added to a solution of 1,504.5 g (6.59 mols) of bisphenol A, 1,415 g of 45 percent strength NaOH and 30 liters of distilled water.

A solution of 16.09 g of 1,4-bis-(4',4''-dihydroxytriphenyl-methyl)-benzene and 145 g of 5 percent strength NaOH are added to this mixture. 1,181 g (11.45 mols) of phosgene are passed into the mixture at 20°–25° C. in the course of 35 minutes, whilst stirring and under a nitrogen atmosphere. During the introduction, 2,070 g of 45 percent strength NaOH are simultaneously added dropwise in a manner such that the pH value remains constant at pH 13. After passing in the phosgene, 8.05 g of triethylamine are added and the mixture is stirred for 1 hour. It is then worked up as in Example B1.

The relative viscosity of the resulting high-molecular polycarbonate elastomer $\eta_{rel}$ is 1.82 (in $CH_2Cl_2$). According to the determination by gel chromatography, the polymer has a bimodal distribution function with a high molecular secondary maximum at a molecular weight of about 280,000 and a principal maximum at a molecular weight of about 54,000. Some mechanical properties of a film are:
tensile strength: 29.3 (MPa);
elongation at break: 260%.

EXAMPLE B3

Preparation of a high-molecular, segmented aliphatic-aromatic polycarbonate of 50% by weight of triethylene glycol polycarbonate and 50% by weight of bisphenol A polycarbonate 132.4 g of the precursor from Example A3, dissolved in 1,725 g of methylene chloride, are added to a solution of 57.4 g of 2,2-bis-(4-hydroxyphenyl)-propane (bisphenol A), 1,300 g of distilled water and 70 g of 45 percent strength NaOH. 58.3 g of phosgene are passed into the mixture in the course of 30 minutes, whilst stirring and under a nitrogen atmosphere and whilst 140 g of 45 percent strength sodium hydroxide solution was simultaneously added dropwise to keep the pH constant at 13. After passing in the phosgene, 39.8 g of a 1 percent strength triethylamine solution are added and the mixture is stirred for 1 hour. The organic phase is separated off and washed successively with 2 percent strength phosphoric acid and finally with distilled water until free from electrolytes. After separating off the water, the solvent is distilled off and the high-molecular polycarbonate elastomer is dried in a vacuum drying cabinet at 80°–100° C. and under 15 mm Hg.

The relative viscosity of the polycarbonate elastomer $\eta$rel is 2.58 (in $CH_2Cl_2$).

According to the determination by gel chromatography, the polymer has a maximum at 130,000.

Some mechanical properties of a film cast from methylene chloride are:

tensile strength: 41.4 MPa;
elongation at break: 358%.

EXAMPLE B4

Preparation of a high-molecular, aliphatic-aromatic polycarbonate of 60% by weight of 1,6-hexanediol polycarbonate and 40% by weight of 2,2-bis-(3,5-dimethyl-4-hydroxyphenyl)propane polycarbonate.

170.8 g of the precursor from Example A4 (Table 1) and 0.48 g of tributylamine (=1 mol % per mol of bisphenol units), dissolved in 1,725 g of methylene chloride, are added to a solution of 22.5 g of 2,2-bis-(3,5-dimethyl-4-hydroxyphenyl)-propane in 46 g of 45 percent strength NaOH and 1,300 g of distilled water.

A solution of 0.49 g of 1,4-bis-(4',4''-dihydroxytriphenyl-methyl)-benzene and 4.5 g of 5 percent strength NaOH is added to this mixture. 76.5 g of phosgene are passed into the mixture in the course of 30 minutes, whilst stirring and under a nitrogen atmosphere and whilst 148 g of 45 percent strength NaOH are simultaneously added dropwise to keep the pH constant at 13. After passing in the phosgene, 4.29 g of tributylamine (=9 mol % per mol of bisphenol units) are added to bring the condensation reaction to completion. The mixture becomes more viscous. After 3 hours, the organic phase is separated off and the polycarbonate elastomer is isolated as described in Example B3.

The relative viscosity of the polycarbonate elastomer $\eta$rel is 1.80 (in $CH_2Cl_2$).

EXAMPLE B5

Preparation of a high-molecular, aliphatic-aromatic polycarbonate of 60% by weight of 1,6-hexanediol polycarbonate and 40% by weight of bis-(2,5-dimethyl-4-hydroxyphenyl)methane polycarbonate.

The starting material obtained from Example A5 (Table 1) is reacted with bis-(3,5-dimethyl-4-hydroxyphenyl)methane and phosgene as in Example B4.

The relative viscosity of the polycarbonate elastomer $\eta$rel is 1.78 (in $CH_2Cl_2$).

EXAMPLE B6

Preparation of a high-molecular aliphatic-aromatic polycarbonate of 50% by weight of 1,6-hexanediol polycarbonate and 50% by weight of 4,4'-dihydroxydiphenyl sulphide polycarbonate 132.5 g of the precursor from Example A6 (Table 1), dissolved in 1,725 g of methylene chloride, are added to a solution of 56.75 g of 4,4'-dihydroxydiphenyl sulphide, 73 g of 45 percent strength NaOH and 1,300 g of distilled water. A solution of 0.78 g of 1,4-bis-(4,4''-dihydroxytriphenylmethyl)-benzene and 7 g of 5 percent strength NaOH are added to this mixture. 60.33 g of phosgene are passed into the mixture in the course of 30 minutes, whilst stirring and under a nitrogen atmosphere and whilst 130 g of 45 percent strength NaOH are simultaneously added dropwise, the pH being kept constant at 13. After passing in the phosgene, 41.4 g of a 1 percent strength triethylamine solution are added and the mixture is worked up as described in Example B3.

The relative viscosity of the polycarbonate elastomer $\eta$rel is 2.04 (0.5 g in 100 ml of phenol/o-dichlorobenzene=1:1).

EXAMPLE B7

Preparation of a high-molecular, segmented aliphatic-aromatic polycarbonate of 60% by weight of 1,6-hexanediol polycarbonate and 40% by weight of 1,1-bis-(4-hydroxyphenyl)cyclohexane polycarbonate.

167.9 g of the precursor from Example A7 (Table 1), dissolved in 1,725 g of methylene chloride, are added to a solution of 24.9 g of 1,1-bis-(4-hydroxyphenyl)-cyclohexane, 0.41 g of p-tert.-butylphenol, 1,300 g of distilled water and 48.4 g of 45 percent strength NaOH. A solution of 0.7 g of 1,4-bis-(4,4'-dihydroxytriphenyl-methyl)-benzene and 6.2 g of 5 percent strength NaOH is added to this mixture. 40.4 g of phosgene are passed into the mixture in the course of 30 minutes, whilst stirring and under a nitrogen atmosphere and whilst 55 g of 45 percent strength sodium hydroxide solution are simultaneously added dropwise in order to keep the pH constant at 13. After passing in the phosgene, 27.5 g of a 1 percent strength triethylamine solution are added and the mixture is worked up as described in Example B3.

The relative viscosity of the polycarbonate elastomer $\eta$rel is 2.25 (in $CH_2Cl_2$).

EXAMPLE B8

Preparation of a high-molecular aliphatic-aromatic polycarbonate of 55% by weight of 1,6-hexanediol polycarbonate and 45% by weight of a polycarbonate of bisphenol A and 4,4'-dihydroxydiphenyl in the molar ratio 1:1.

124 g of the viscous oil from Example A2, dissolved in 1,725 g of methylene chloride, are added to a solution of 30.14 g of bisphenol A, 35.9 g of 4,4'-dihydroxydiphenyl, 1,300 g of distilled water and 68.5 g of 45 percent strength NaOH. A solution of 0.78 g of 1,4-bis-(4,4''-dihydroxytriphenylmethyl)-benzene and 6.5 g of 5 percent strength NaOH is added to this mixture. 76.3 g of phosgene are passed into the mixture in the course of 30 minutes, whilst stirring and under a nitrogen atmosphere and whilst 180 g of 45 percent strength NaOH are simultaneously added dropwise. After passing in the phosgene, 39.1 g of a 1 percent strength triethylamine solution are added and the mixture is worked up as in Example 3.

The relative viscosity of the polycarbonate elastomer $\eta$rel is 1.76 (in phenol/o-dichlorobenzene=1:1).

We claim:

1. A process for the preparation of an aliphatic-aromatic polycarbonate with diphenol carbonate end groups comprising conjointly reacting:
   (i) an aliphatic diol, the OH groups of which are in at least the $\alpha$-position and $\gamma$-position relative to one another or further removed from one another,
   (ii) a carbonic acid bis-aryl ester, and (iii) one or more diphenols at a temperature between about 80° and 270° C. and under reduced pressure between about 200 mm Hg and 0.1 mm Hg, characterized in that n mols of aliphatic diol, m mols of diphenol and p mols of carbonic acid bis-aryl ester are employed for the preparation of 1 mol of the aliphatic-diol bis-diphenol carbonate, wherein n is a number from about 2 to 40 chosen in each case so that the product of n and of the molecular weight $\overline{M}n$ (number average), increased by 26, of the diol employed is a number between about 300 and 10,000, m is a number between about 2 and 5 p is at least n+1, but at most (n+m)−1.

2. The process according to claim 1, wherein the reaction is carried out at a temperature between about 100° and 220° C.

3. The process of claim 1, wherein between about 0.0001 and 1% by weight of a catalyst is employed.

4. The process of claim 1, when carried out in bulk.

5. The process of claim 1, when carried out in the presence of an inert solvent.

6. The process of claim 1, wherein the carbonic acid bis-aryl ester is one having the general formula

  (III)

wherein Ar is a substituted or unsubstituted aryl radical having from about 6 to 18 carbon atoms.

7. The process of claim 1, wherein the diphenol has the general formula

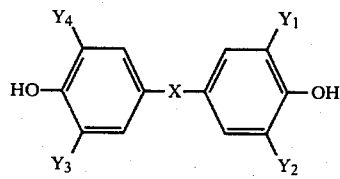  (II)

wherein

X denotes a single bond, —CH$_2$—,

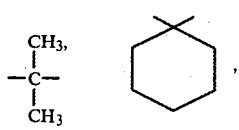

O, S, SO$_2$, or

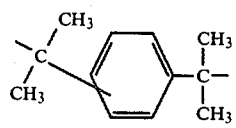

Y$_1$, Y$_2$, Y$_3$ and Y$_4$ are identical or different and denote a hydrogen or halogen atom or a C$_1$ to C$_4$ alkyl group.

8. A process for the preparation of a compound of the formula

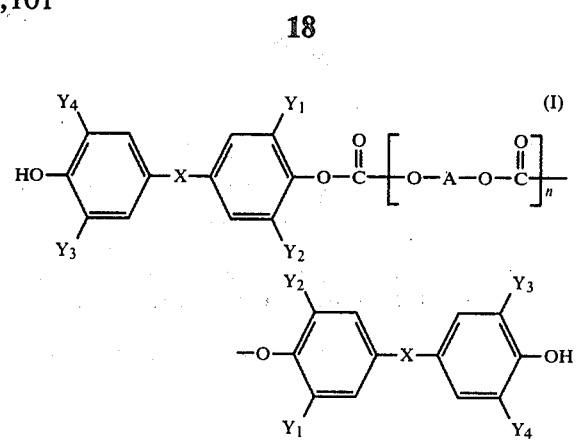  (I)

wherein

A denotes the bivalent radical of an aliphatic diol,

X denotes a single bond

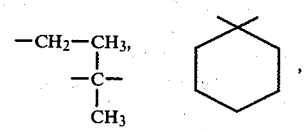

O, S, SO$_2$, or

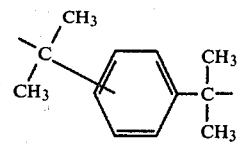

Y$_1$, Y$_2$, Y$_3$ and Y$_4$ are identical or different and denote a hydrogen or halogen atom or a C$_1$ to C$_4$ alkyl group and n is an integer from 2 to 40 comprising conjointly reacting (i) an aliphatic diol, the OH groups of which are in at least the α-position and γ-position relative to one another or further removed from one another, (ii) a diphenol of the general formula

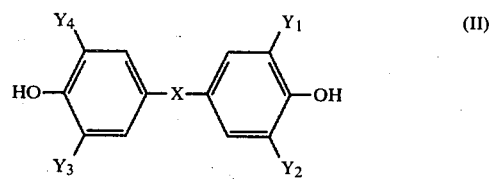  (II)

wherein

X denotes a single bond, —CH$_2$—,

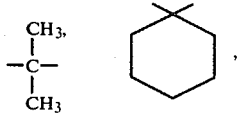

O, S, SO$_2$ or

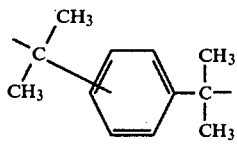

$Y_1$, $Y_2$, $Y_3$ and $Y_4$ are identical or different and denote a hydrogen or halogen atom or a $C_1$ to $C_4$ alkyl group, and (iii) a carbonic acid bis-aryl ester of the general formula $$Ar-O-\underset{\underset{O}{\|}}{C}-O-Ar$$

wherein Ar is a substituted or unsubstituted aryl radical having 6 to 18 carbon atoms at a temperature between about 80° and 270° C. and under reduced pressure between about 200 mm Hg and 0.1 mm Hg, characterized in that n mols of aliphatic diol, m mols of diphenol and p mols of carbonic acid bis-aryl ester are employed for the preparation of 1 mol of the Formula I compounds, wherein n is a number from about 2 to 40 chosen in each case so that the product of n and of the molecular weight $\overline{M}_n$ (number average), increased by 26, of the diol employed is a number between about 300 and 10,000, and m is a number between about 2 and 5 and p is at least n+1, but at most (n+m)−1.

9. An aliphatic diol bis-diphenol carbonate of the formula

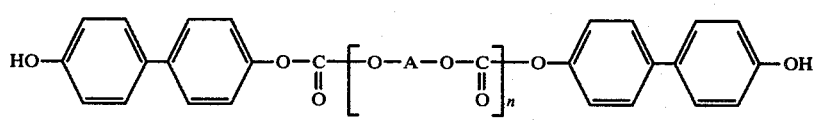

wherein

A denotes the bivalent radical of an aliphatic diol, selected from a group consisting of 1,3-propanediol, 1,4-butanediol, 1,5-pentanediol, 3-methyl-1,5-pentanediol, trimethyl-1,6-hexanediol, 1,6-hexanediol, 1,12-dodecanediol, 1,12-octadecanediol, diethylene glycol, dipropylene glycol, neopentyl glycol and prepolymeric aliphatic polycarbonate diols having a $\overline{M}_n$ between 300 and 3,000 prepared from diethylene glycol, 1,6-hexanediol, 1,4-butanediol or 1,12-dodecanediol, X denotes a single bond, $-CH_2-$,

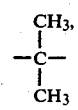 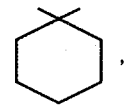

O, S, SO$_2$ or

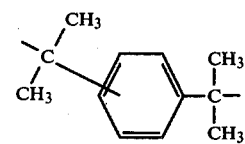

$Y_1$, $Y_2$, $Y_3$ and $Y_4$ are identical or different and denote a hydrogen or halogen atom or a $C_1$ or $C_4$ alkyl group and n is an integer from 2 to 40.

10. An aliphatic-diol bis-diphenol carbonate of the formula (Ia)

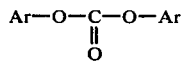

wherein

A is the bivalent radical of an aliphatic diol selected from a group consisting of 1,3-propanediol, 1,4-butanediol, 1,5-pentanediol, 3-methyl-1,5-pentanediol, trimethyl-1,6-hexanediol, 1,6-hexanediol, 1,12-dodecanediol, 1,12-octadecanediol, diethylene glycol, dipropylene glycol, neopentyl glycol and prepolymeric aliphatic polycarbonate diols having a $\overline{M}_n$ between 300 and 3,000 prepared from diethylene glycol, 1,6-hexanediol, 1,4-butanediol or 1,12-dodecanediol, and n denotes a number from 2 to 40.

11. An aliphatic diol bis-diphenol carbonate of the formula (Ib)

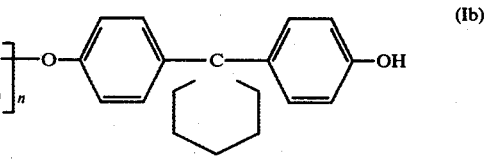

wherein

A is the bivalent radical of an aliphatic diol selected from a group consisting of 1,3-propanediol, 1,4-butanediol, 1,5-pentanediol, 3-methyl-1,5-pentanediol, trimethyl-1,6-hexanediol, 1,6-hexanediol, 1,12-dodecanediol, 1,12-octadecanediol, diethylene glycol, dipropylene glycol, neopentyl glycol and prepolymeric aliphatic polycarbonate diols having a $\overline{M}_n$ between 300 and 3,000 prepared from diethylene glycol, 1,6-hexanediol, 1,4-butanediol or 1,12-dodecanediol, and n denotes a number from 2 to 40.

12. An aliphatic-diol bis-diphenol carbonate of the formula

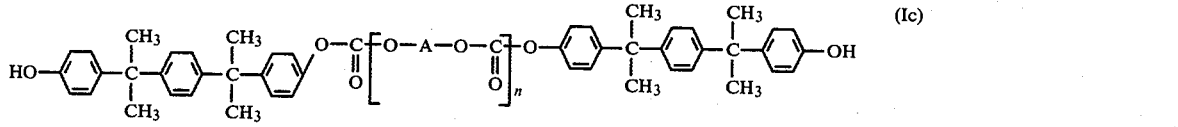

(Ic)

wherein

A is the bivalent radical of an aliphatic diol selected from a group consisting of 1,3-propanediol, 1,4-butanediol, 1,5-pentanediol, 3-methyl-1,5-pentanediol, trimethyl-1,6-hexanediol, 1,6-hexanediol, 1,12-dodecanediol, 1,12-octadecanediol, diethylene glycol, dipropylene glycol, neopentyl glycol and prepolymeric aliphatic polycarbonate diols having a $M_n$ between 300 and 3,000 prepared from diethylene glycol, 1,6-hexanediol, 1,4-butanediol or 1,12-dodecanediol, and n denotes a number from 2 to 40.

13. An aliphatic-diol bis-diphenol carbonate of the formula

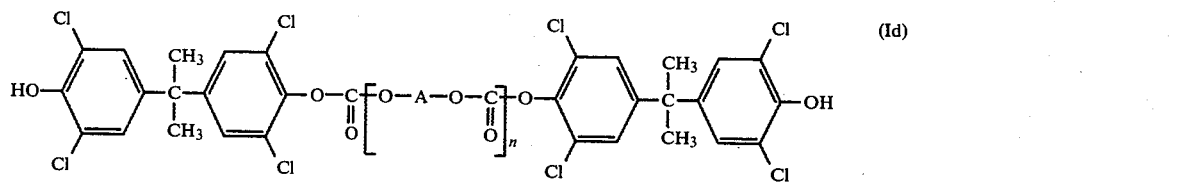

(Id)

wherein

A is the bivalent radical of an aliphatic diol selected from a group consisting of 1,3-propanediol, 1,4-butanediol, 1,5-pentanediol, 3-methyl-1,5-pentanediol, trimethyl-1,6-hexanediol, 1,6-hexanediol, 1,12-dodecanediol, 1,12-octadecanediol, diethylene glycol, dipropylene glycol, neopentyl glycol and prepolymeric aliphatic polycarbonate diols having a $\overline{M}_n$ between 300 and 3,000 prepared from diethylene glycol, 1,6-hexanediol, 1,4-butanediol or 1,12-dodecanediol, and n denotes a number from 2 to 40.

14. An aliphatic-diol bis-diphenol carbonate of the formula

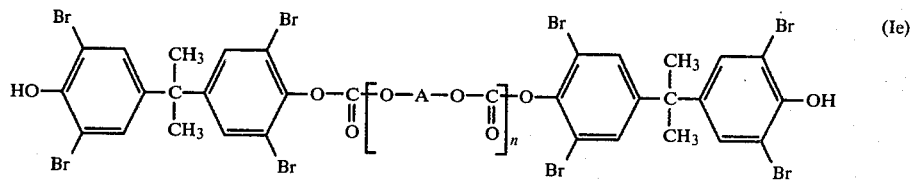

(Ie)

wherein

A is the bivalent radical of an aliphatic diol selected from a group consisting of 1,3-propanediol, 1,4-butanediol, 1,5-pentanediol, 3-methyl-1,5-pentanediol, trimethyl-1,6-hexanediol, 1,6-hexanediol, 1,12-dodecanediol, 1,12-octadecanediol, diethylene glycol, dipropylene glycol, neopentyl glycol and prepolymeric aliphatic polycarbonate diols having a $\overline{M}_n$ between 300 and 3,000 prepared from diethylene glycol, 1,6-hexanediol, 1,4-butanediol or 1,12-dodecanediol, and n denotes a number from 2 to 40.

15. An aliphatic-diol bis-diphenol carbonate of the formula

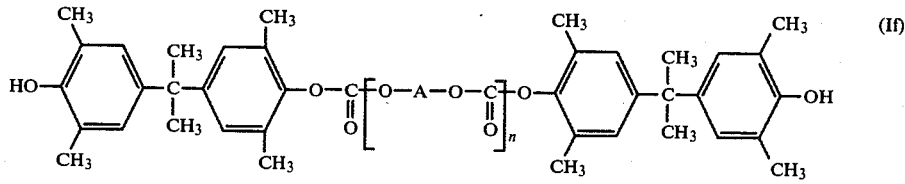

(If)

wherein

A is the bivalent radical of an aliphatic diol selected from a group consisting of 1,3-propanediol, 1,4-butanediol, 1,5-pentanediol, 3-methyl-1,5-pentanediol, trimethyl-1,6-hexanediol, 1,6-hexanediol, 1,12-dodecanediol, 1,12-octadecanediol, diethylene glycol, dipropylene glycol, neopentyl glycol and prepolymeric aliphatic polycarbonate diols having a $\overline{M}_n$ between 300 and 3,000 prepared from diethylene glycol, 1,6-hexanediol, 1,4-butanediol or 1,12-dodecanediol, and n denotes a number from 2 to 40.

16. An aliphatic-diol bis-diphenol carbonate of the formula

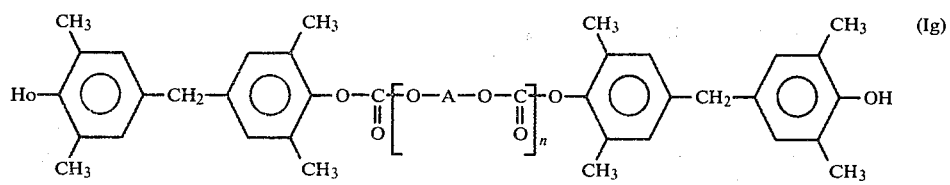

wherein
A is the bivalent radical of an aliphatic diol selected from a group consisting of 1,3-propanediol, 1,4-butanediol, 1,5-pentanediol, 3-methyl-1,5-pentanediol, trimethyl-1,6-hexanediol, 1,6-hexanediol, 1,12-dodecanediol, 1,12-octadecanediol, diethylene glycol, dipropylene glycol, neopentyl glycol and prepolymeric aliphatic polycarbonate diols having a $M_n$ between 300 and 3,000 prepared from diethylene glycol, 1,6-hexanediol, 1,4-butanediol or 1,12-dodecanediol, and n denotes a number from 2 to 40.

17. An aliphatic-diol bis-diphenol carbonate of the formula

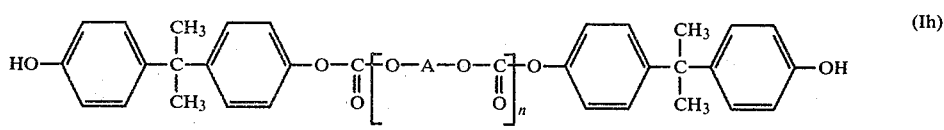

wherein
A is the bivalent radical of an aliphatic diol selected from a group consisting of 1,3-propanediol, 1,4-butanediol, 1,5-pentanediol, 3-methyl-1,5-pentanediol, trimethyl-1,6-hexanediol, 1,6-hexanediol, 1,12-dodecanediol, 1,12-octadecanediol, diethylene glycol, dipropylene glycol, neopentyl glycol and prepolymeric aliphatic polycarbonate diols having a $\overline{M}_n$ between 300 and 3,000 prepared from diethylene glycol, 1,6-hexanediol, 1,4-butanediol or 1,12-dodecanediol, and n denotes a number from 2 to 40.

18. An aliphatic-diol bis-diphenol carbonate of the formula

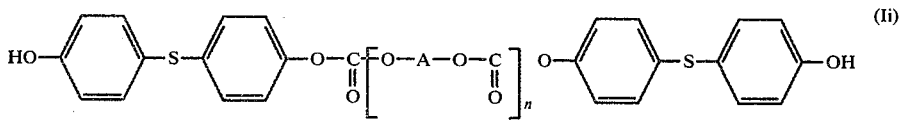

wherein
A is the bivalent radical of an aliphatic diol selected from a group consisting of 1,3-propanediol, 1,4-butanediol, 1,5-pentanediol, 3-methyl-1,5-pentanediol, trimethyl-1,6-hexanediol, 1,6-hexanediol, 1,12-dodecanediol, 1,12-octadecanediol, diethylene glycol, dipropylene glycol, neopentyl glycol and prepolymeric aliphatic polycarbonate diols having a $\overline{M}_n$ between 300 and 3,000 prepared from diethylene glycol, 1,6-hexanediol, 1,4-butanediol or 1,12-dodecanediol, and n denotes a number from 2 to 40.

19. A process for the production of a high-molecular weight aliphatic-aromatic polycarbonate, comprising reacting an aliphatic-aromatic polycarbonate with diphenol carbonate end groups of Claim 9 with a diphenol and phosgene in a liquid mixture comprising an inert organic solvent and an alkaline aqueous solution at a temperature between about 0° C. and 80° C. at a pH value between about 9 and 14, and wherein after the addition of phosgene, polycondensation is carried out by adding from about 0.2 mol % to 10 mol %, relative to the molar amount of diphenol, of a tertiary aliphatic amine, the weight ratio of aliphatic-diol bis-diphenol carbonate to the diphenol being determined by the desired proportion of aromatic polycarbonate and the proportion of aliphatic polycarbonate in the resulting high-molecular weight aliphatic-aromatic polycarbonate elastomers.

20. The process of claim 19, wherein the reaction is carried out at a temperature between about 15° C. and 40° C.

21. The process of claim 19, wherein the diphenol has the general formula

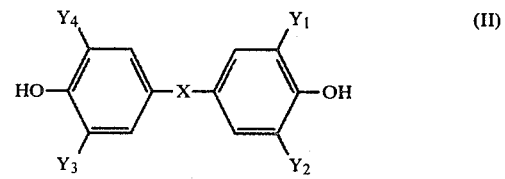

wherein
X denotes a single bond, —CH$_2$—,

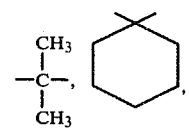

O, S, SO$_2$ or

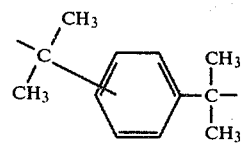

and $Y_1$, $Y_2$, $Y_3$ and $Y_4$ are identical or different and denote a hydrogen or halogen atom or a $C_1$ to $C_4$ alkyl group.

22. The process according to claim 19, wherein the tertiary aliphatic amine has from about 3 to about 15 C atoms per amine molecule.

23. The process according to claim 19, wherein between about 0.05 and about 2 mol %, relative to the weight of the diphenols employed, of trifunctional or more than trifunctional compounds are employed.

24. The process according to claim 19, wherein the high molecular weight aliphatic-aromatic polycarbonate is subjected to gelling, shearing or heat treatment in the course of isolation whereby the recovered polymer is multi-phase.

25. The process according to claim 19, wherein the high-molecular weight aliphatic-aromatic polycarbonate is not subjected to gelling, shearing or heat treatment in the course of isolation whereby the recovered polymer is single phase.

* * * * *